(12) United States Patent
Chapman et al.

(10) Patent No.: US 11,784,555 B2
(45) Date of Patent: Oct. 10, 2023

(54) HIGH-POWER MICROINVERTER AND SYSTEM

(71) Applicant: Enphase Energy, Inc., Petaluma, CA (US)

(72) Inventors: Patrick L. Chapman, Austin, TX (US); John Scott Berdner, Grass Valley, CA (US); Mark Baldassari, Santa Rosa, CA (US); Raghuveer R. Belur, Los Altos Hills, CA (US); Donald H. Scrutchfield, Austin, TX (US); Rian van der Colff, Christchurch (NZ); Phillip Mark Hunter, Prebbleton (NZ); Philip Rothblum, Austin, TX (US)

(73) Assignee: Enphase Energy, Inc., Petaluma, CA (US)

( * ) Notice: Subject to any disclaimer, the term of this patent is extended or adjusted under 35 U.S.C. 154(b) by 10 days.

(21) Appl. No.: 17/479,240

(22) Filed: Sep. 20, 2021

(65) Prior Publication Data

US 2022/0103060 A1 Mar. 31, 2022

Related U.S. Application Data

(60) Provisional application No. 63/083,159, filed on Sep. 25, 2020.

(51) Int. Cl.
*H02M 1/32* (2007.01)
*H02M 7/44* (2006.01)

(52) U.S. Cl.
CPC ............... *H02M 1/32* (2013.01); *H02M 7/44* (2013.01)

(58) Field of Classification Search
CPC .................................. H02M 1/32; H02M 7/44
See application file for complete search history.

(56) References Cited

U.S. PATENT DOCUMENTS

| | | | | |
|---|---|---|---|---|
| 2011/0019444 A1* | 1/2011 | Dargatz | ................... | H01H 9/50 |
| | | | | 361/93.2 |
| 2013/0094262 A1* | 4/2013 | Avrutsky | ............... | G01R 31/64 |
| | | | | 363/125 |
| 2014/0119072 A1 | 5/2014 | Behrends et al. | | |
| 2014/0183953 A1* | 7/2014 | Harrison | ............. | H02M 7/4807 |
| | | | | 307/52 |

(Continued)

FOREIGN PATENT DOCUMENTS

| | | |
|---|---|---|
| JP | 2015002606 A | 1/2015 |
| JP | 2018119805 A | 8/2018 |
| KR | 1020180059006 A | 6/2018 |

OTHER PUBLICATIONS

International Search report and Written Opinion for application No. PCT/US2021/051033 dated Jan. 10, 2022.

*Primary Examiner* — Rafael O De Leon Domenech
(74) *Attorney, Agent, or Firm* — Moser Taboada

(57) ABSTRACT

A method and apparatus for converting DC power to AC power. For example, apparatus for converting DC power to AC power comprises an input adapted to be coupled to a high-powered distributed generator having a maximum voltage at a first voltage and an arc fault mitigation device, coupled to the input, for providing a second voltage at the input that is lower than the first voltage, where a difference between the first voltage and the second voltage is not large enough to cause an arc.

20 Claims, 4 Drawing Sheets

(56) References Cited

U.S. PATENT DOCUMENTS

| | | | |
|---|---|---|---|
| 2015/0078053 A1* | 3/2015 | Harrison | H02M 7/4807 363/132 |
| 2015/0098251 A1* | 4/2015 | Harrison | H02M 7/4807 363/56.05 |
| 2016/0181799 A1* | 6/2016 | Kanemaru | H02S 50/00 307/78 |

* cited by examiner

HIGH-POWER MICROINVERTER AND SYSTEM

CROSS-REFERENCE TO RELATED APPLICATIONS

This application claims the benefit of and priority to U.S. Provisional Patent Application Ser. No. 63/083,159, filed on Sep. 25, 2020, the entire contents of which is incorporated herein by reference.

BACKGROUND

Field

Embodiments of the present disclosure generally relates to energy generation and/or storage systems and, in particular, to a high-power microinverter for use in such systems.

Description of the Related Art

A solar energy generation and storage system typically comprises a plurality of solar panels, one or more power inverters, a storage element, and a service panel. A solar panel is, generally speaking, a collection of one or more solar cells that are mechanically supported or linked including modules, panels, building integrated photovoltaics (BI-PVs), flexible cell sheets, and the like. The solar panels are arranged in an array and positioned to maximize solar exposure. In a microinverter based system, each solar panel or small groups of panels may be coupled to an inverter (so-called microinverters). The inverter(s) convert the DC power produced by the solar panels into AC power. The AC power is coupled to the service panel for use by a facility (e.g., home or business), supplied to the power grid, and/or coupled to a storage element such that energy produced at one time is stored for use at a later time. Other energy generators having flexible capacity that is defined at installation include wind turbines arranged on a so-called wind farm. Storage elements may be one or more of batteries, fly wheels, hot fluid tank, hydrogen storage or the like. The most common storage element is a battery pack (i.e., a plurality of battery cells) having a bidirectional inverter coupled to the service panel to supply the batteries with DC power as well as allow the batteries to discharge through the inverter to supply AC power to the facility when needed.

To simplify and lower the cost of a microinverter based system, a plurality of solar panels may be coupled together and be coupled to a single high power microinverter. However, such systems raise the input voltage or input current to the microinverter. An increased voltage or current raises safety hazards such as arc fault and/or electric shock to, for example, first responders. As such, arc fault detection and/or mitigation circuits and hazard control (e.g., rapid shutdown) circuits are necessary to deactivate the microinverter if an arc fault occurs or the system requires rapid shutdown. Such circuitry increases the cost and complexity of the microinverter.

Therefore, there is a need for a high power microinverter that does not require additional safety circuitry.

SUMMARY

In accordance with at least some embodiments, an apparatus for converting DC power to AC power includes an input adapted to be coupled to a high-powered distributed generator having a maximum voltage at a first voltage and an arc fault mitigation device, coupled to the input, for providing a second voltage at the input that is lower than the first voltage, where a difference between the first voltage and the second voltage is not large enough to cause an arc.

In accordance with at least some embodiments, a method for converting DC power to AC power in an apparatus includes providing, at an input, a first voltage having a maximum voltage from a high-powered distributed generator and providing a second voltage at the input that is lower than the first voltage, where a difference between the first voltage and the second voltage is not large enough to cause an arc.

In accordance with at least some embodiments, a non-transitory computer readable storage medium has stored thereon instructions that when executed by a processor perform a method for converting DC power to AC power in an apparatus. The method includes providing, at an input, a first voltage having a maximum voltage from a high-powered distributed generator and providing a second voltage at the input that is lower than the first voltage, where a difference between the first voltage and the second voltage is not large enough to cause an arc.

BRIEF DESCRIPTION OF THE DRAWINGS

So that the manner in which the above recited features of the present disclosure can be understood in detail, a particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
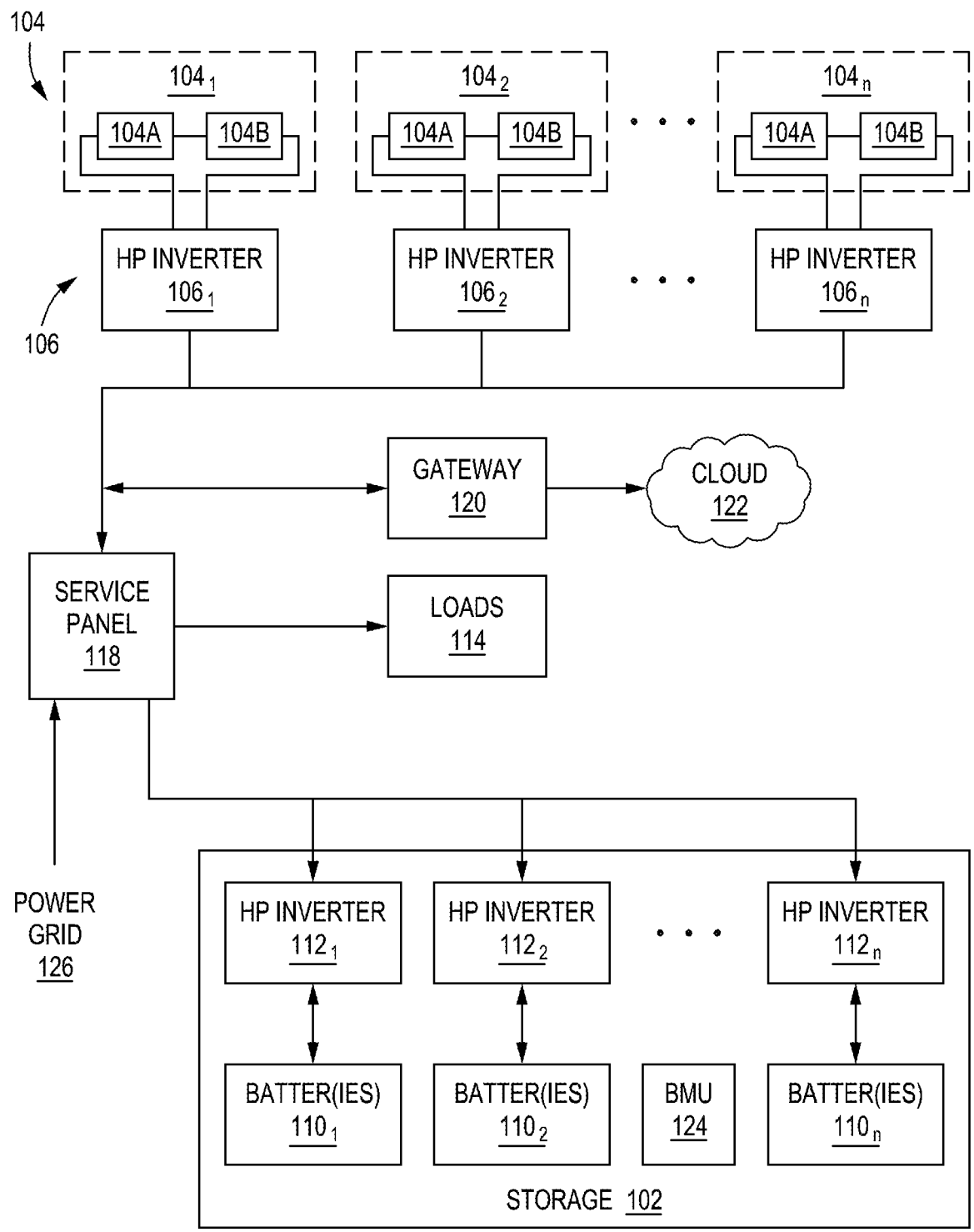
FIG. 1 depicts a block diagram of solar energy generation with an optional storage system using high-power microinverters, in accordance with at least some embodiments of the present disclosure.

Embodiments of the present disclosure comprise a high-power microinverter and energy generation systems with optional energy storage that utilize such high-power microinverters. Embodiments of the disclosure comprise a high-power microinverter, i.e., a microinverter that can accommodate the output power of two (or more) photovoltaic (PV) panels and generate more power than can be sourced by a state-of-the-art single solar panel. For example, some solar panels can be rated for approximately 425 W of DC power at standard test conditions (STC). A suitable high-power microinverter may be rated for 640 W of AC power, greater than the STC rating of the single panel. In this example, two solar panels would have a combined STC rating of 850 W.

When paired with a 640 W high-power microinverter, the DC-to-AC ratio is (850 W)/(640 W)=1.33, which is well within an industry norms of 1.00 to 1.5. Likewise, as PV panel technology causes panels to grow in power, a high-power microinverter product will need to grow in power to maintain a suitable DC-AC ratio.

In at least some embodiments, the high-power microinverter is coupled to two PV panels connected in series. Such an arrangement creates a high voltage (e.g., up to 120 volts) output that is capable of producing an arc fault between the wire pair from the PV panels. Generally, as established as a regulatory limit, a potential maximum voltage above 80 volts requires a dedicated active arc fault detection and mitigation circuit that will shut down the system upon detecting an arc fault. However, an arc may occur at voltages as low as 30 volts. An embodiment of the high-power microinverter provides an automatic technique for arc fault mitigation by comprising, at its input, an arc fault mitigation device (i.e., a passive or active device) that maintains the input voltage near the expected maximum, open circuit, voltage achievable by the high-power distributed generator (e.g., PV panel pair). In embodiments, the arc fault mitigation device is one or more capacitors that charge to an input DC voltage such that the difference between the charged voltage and the open-circuit PV panel voltage is minimal (i.e., well below the 80 volts that would otherwise require an active arc fault detector, mitigation and rapid shut-down circuit).

In another embodiment of the high-power microinverter, the energy generation system may be configured to produce three phase power while using single phase high-power microinverters. In addition, all phases of the interconnecting cables are used to carry power line communications to create a robust communications network. In one embodiment, the high-power microinverter operates in a bi-directional manner and may be used within a so-called "AC battery" to charge and discharge the storage cells of a battery, as needed. In this configuration, the power line communications may be used to communicate amongst high-power microinverters within the storage system to facilitate charge balancing amongst the storage cells.

FIG. 1 depicts a block diagram of distributed energy generation system (e.g., a system 100) with an optional storage system 102 in accordance with at least one embodiment of the disclosure. The system 100 comprises a high-powered distributed generator 103 (e.g., pairs of solar panels $104_1$, $104_2$, $104_3$, ... $104_n$ coupled to high-power microinverters $106_1$, $106_2$, $106_3$, ... $106_n$), optional storage 102 (e.g., batteries $110_1$, $110_2$, ... $110_n$ coupled to bidirectional inverters $112_1$, $112_2$, ... $112_n$), and a service panel 118 through which the distributed generator 103 is coupled to the optional storage system 102. The service panel 118 is also coupled to a plurality of loads 114. The loads 114, in a residential application, may comprise washer, dryer, refrigerator, air conditioner, hot water heater, electric car, and/or any other electricity consuming device in the household. The loads 114, in an industrial application, may comprise electric motors, heating systems, air conditioning systems, refrigerators, freezers, and/or any other electricity consuming device generally used in an industrial setting. The service panel 118 may also be coupled to the grid 126, such that, energy may be consumed from the grid 126 or sourced to the grid 126, as necessary. In a commercial power system, the service panel may be connected to the grid 126, without any of the loads 114 being connected to the system 100.

To facilitate command and control of the system 100, a gateway 120 is communicatively coupled to the high-power microinverters 106 and/or 112 and the internet or cloud 122. The communications may be via powerline, wired, wireless, or a combination of communication types. Wired communications may include, for example, ethernet, RS 485, or another wired network protocol. Wireless communications may include, for example, Wi-Fi, Bluetooth, or other wireless protocol. Examples of powerline communications (PLC) are described in commonly assigned U.S. Pat. Nos. 9,030,302, 9,407,326, 9,509,371, 8,411,790, 10,468,993, 8,659,922, 9,698,869, and 10,367,408, each of which is incorporated by reference herein in their entirety.

The optional storage system 102 comprises a plurality of high-power microinverters 112, a plurality of batteries 110 and a battery management unit 124 (BMU). The battery management unit 124 communicates with the high-power microinverters, as described below, to facilitate command and control of the energy flow to/from the optional storage system 102. Communication may be wired or wireless or a combination thereof. In embodiments, the battery management unit 124 communicates with the high-power microinverters 112 via power line communications and communicates through a wireless connection to the gateway 120.

Although FIG. 1 depicts a high-powered distributed generator 103 having a pair of serially connected solar panels 104A and 104B (e.g., a pair of high-powered distributed generators) coupled to a single inverter (i.e., high-power microinverter 106), this depiction is not meant to limit the scope of the disclosure. For example, embodiments of the disclosure may also be used with distributed generators having a single high-power solar panel coupled to a single, high-power microinverter. Furthermore, distributed generators may include other forms of high-power energy generator such as wind turbines arranged on a so-called "wind farm", hydroelectric turbine arrays, and the like. Similarly, energy storage in a battery-based storage system is described as an example of the type of storage whose energy flow into and out of the storage is controlled by a high-power microinverter in accordance with an embodiment of the disclosure; however, other forms of energy storage may be used such as fly wheel(s), hot fluid tank(s), hydrogen storage system(s), pressurized gas storage system(s), pumped storage hydropower, fuel cells, or the like.

Figure 2:
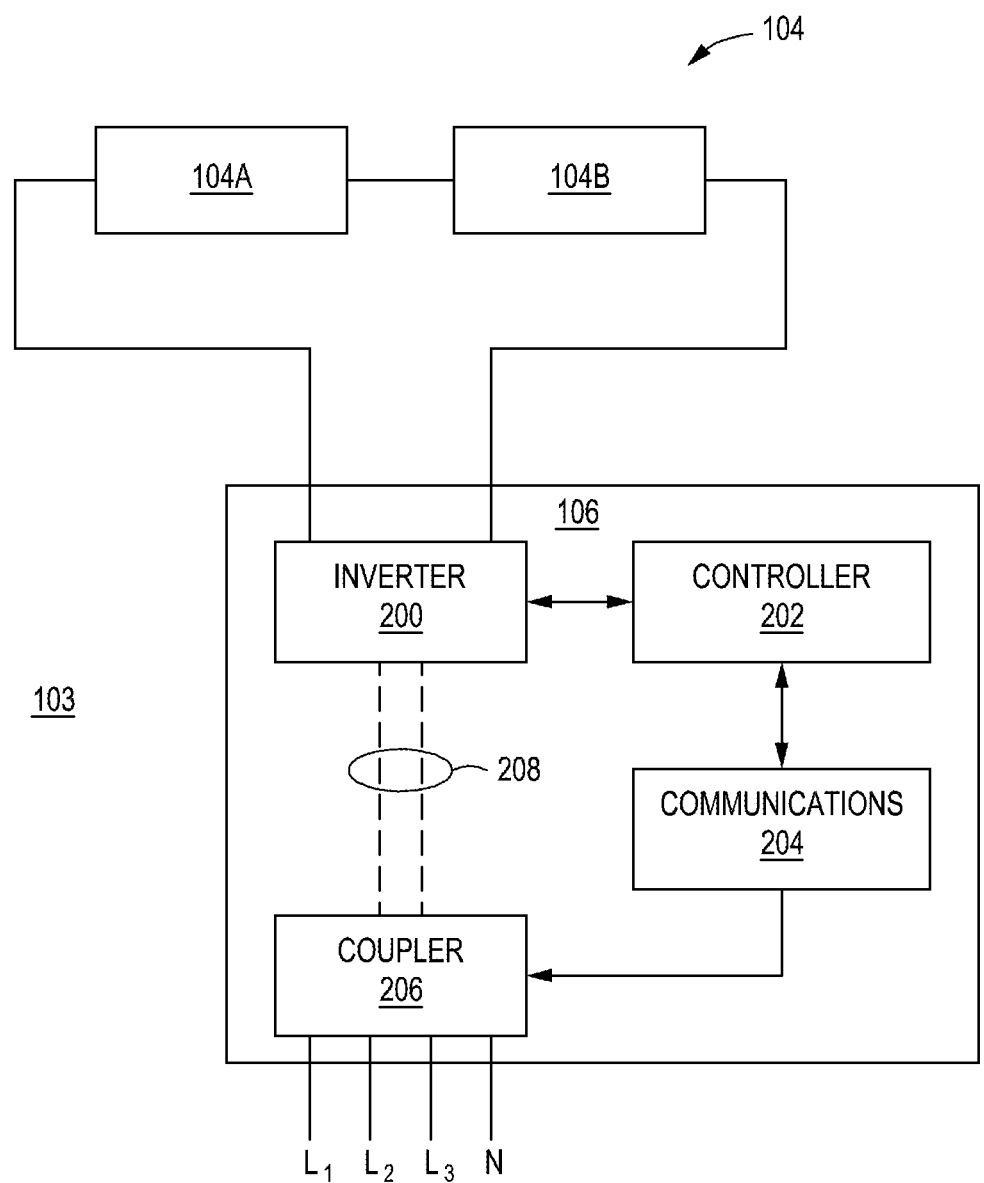
FIG. 2 depicts a block diagram of a portion of the system of FIG. 1, in accordance with at least some embodiments of the present disclosure.

FIG. 2 depicts a block diagram of a portion of the high-powered distributed generator 103 forming a specific embodiment of the present disclosure. FIG. 2 depicts a pair of PV panels 104 (comprising a pair of serially connected solar panels 104A and 104B) coupled to a high-power microinverter 106. The high-power microinverter 106 comprises an inverter 200, a controller 202, a communications device 204, and a coupler 206. The inverter receives high power DC power from the PV panel 104 and generates AC power. Operation of the inverter 200 is controlled by the controller 202, as shall be described in detail with respect to FIG. 4 below. In the embodiment shown, the communications device 204 is a PLC device. The PLC device sends and receives signals via the powerlines that interconnect the microinverters. In one example, the PLC device frequency shift key (FSK) modulates data onto the power output of the inverter 200 as well as receives signals from the power lines. The PLC device converts the received signals into digital data that is coupled to the controller 202 for use in controlling the inverter 200. Other forms of communication signaling other than FSK may be used. Although the communications device 204 is shown as being separate from the controller, in an alternative embodiment, the communications device 204 is a component of the controller 202.

In one embodiment, the inverter 200 is a single-phase inverter that produces AC power on two output wires 208. However, the signal phase inverter may be part of a three-phase system. The coupler 206 couples AC power from the inverter 200 to output lines $L_1$ and $L_2$. The communications device 204 couples communications signals to/from all the lines $L_1$, $L_2$, $L_3$ and N. Connecting the PLC signals to all three phase lines produces a robust communications channel with inherent redundancy. As shall be described with respect to FIG. 3, the interconnecting cable coupling the inverters to one another rotates the phase connections to enable three-phase power to be generated from at least three single phase inverters.

As depicted in FIG. 2, a pair of serially connected solar panels 104A and 104B supply a high voltage (e.g., up to about 120V) to the input of the high-power microinverter 106. Because the input voltage exceeds a level that can cause an arc fault, typically, the high-power microinverter would require an arc fault detection and mitigation circuit. However, as is described in detail with respect to FIG. 4, the inverter 200 is designed such that an arc fault detection and mitigation circuit is unnecessary.

The high-power microinverter 106 may also be used with a single-panel, though it would be limited in power by the panel. Furthermore, the high-powered microinverter 106 may be used with three or more panels as long as they conform to a voltage limit of the input of the microinverter. As such, although the high-power microinverter is used with two panels, the high-power microinverter may be used with any number of panels as long as, when the panels are connected in series, the output voltage of the panel string conform to the voltage limit of the high-power microinverter DC input. The voltage limit is established by the arc fault mitigation device as described below.

Figures 3, 5:
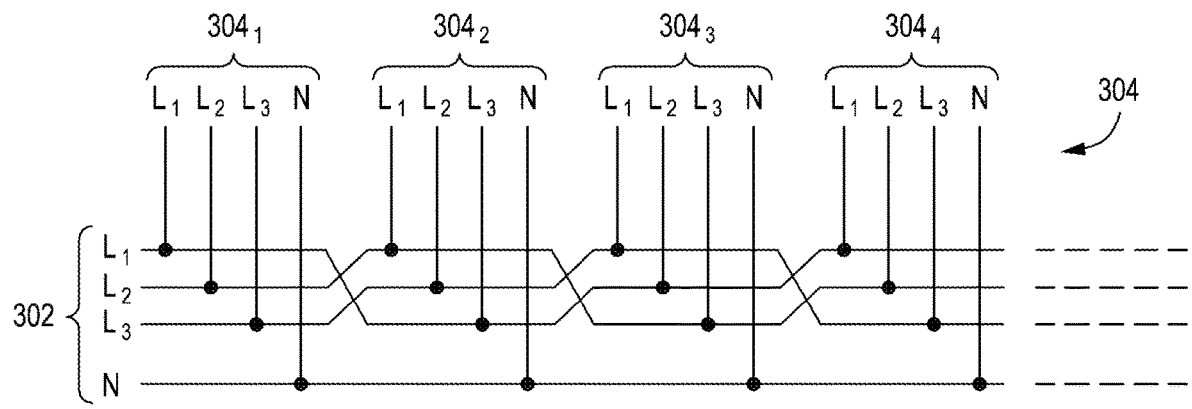
FIG. 3 depicts a cable wire schematic that is used to couple high-power microinverters together to produce a three-phase system, in accordance with at least some embodiments of the present disclosure.
FIG. 5 is a flowchart of a method for converting DC to AC in an apparatus, in accordance with at least some embodiments of the present disclosure.

FIG. 3 depicts a schematic wiring diagram of an embodiment of a cable 300 used to interconnect the high-power microinverters 106. The cable 300 comprises three phases represented by $L_1$, $L_2$, $L_3$, and N at cable 302. Each high-power microinverter 106 (not shown) is connected to drop 304 (cable drop) comprising drops $304_1$, $304_2$, $304_3$, $304_4$, and so on. Each high-power microinverter outputs AC power only on two terminals, for example, $L_1$ and $L_2$ of each drop. As depicted, the cable rotates phase connection after each drop. This cable structure enables three or more single phase high-power microinverters to operate as a three-phase power generator from the viewpoint of the terminal end of the cable 302. The neutral wire N is carried through the cable as the neutral for all three phases. Such a system is described in commonly assigned U.S. Pat. Nos. 7,855,473 and 8,222,767, each of which is hereby incorporated by reference herein in their entireties. The PLC signal is coupled to all three phases and neutral to create a plurality of redundant communications channels.

Figure 4:
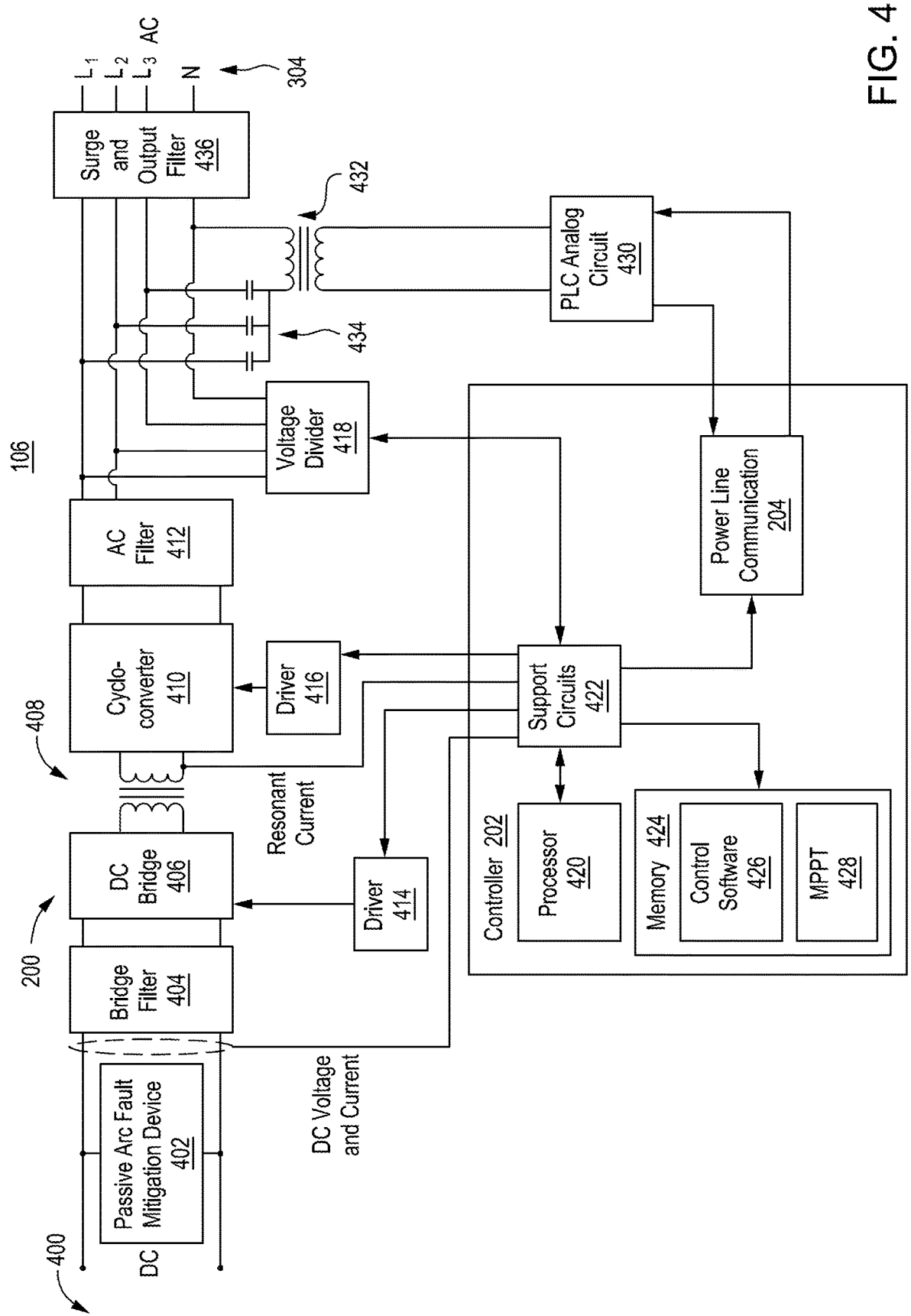
FIG. 4 depicts a block diagram of a high-power microinverter, in accordance with at least some embodiments of the present disclosure.

FIG. 4 depicts a block diagram of the high-power microinverter 106 and FIG. 5 is a flowchart of a method 500 for converting DC to AC in an apparatus, in accordance with at least some embodiments of the disclosure. The high-power microinverter 106 comprises: the inverter 200, a controller 202 and a communications device 204 that may be part of the controller 202 (as shown in FIG. 4) or a separate device from the controller (as shown in FIG. 2). One example of a communications device is a communication device 204 (e.g., power line communications (PLC)) that applies modulation via the coupler 206 to the three phase output lines of the drop 304.

DC power from the distributed generator (e.g., PV panel 104) is applied to input 400 and is applied across an arc fault mitigation device 402 and into a bridge filter 404 (e.g., low pass filter). One example of an inverter 200 is a resonant cycloconverter comprising the bridge filter 404, a DC bridge 406, transformer 408, cycloconverter 410, AC filter 412, DC bridge driver circuit 414 and cycloconverter driver circuit 416. This resonant cycloconverter is a conventional cycloconverter circuit that is well known in the art. Other DC-AC inverter circuits (e.g., resonant inverters, quasi-resonant converters, boost inverters, buck-boost inverters, and the like) may be substituted for the cycloconverter to form alternative embodiments of the disclosure. The inverter should be designed to handle the high power of the dual solar panels or other high-power distributed generator to convert the high-power DC to high-power AC.

The controller 202 receives samples of the DC voltage and current as well as the resonant current at the transformer 408 and AC voltages on the drop 304. The AC voltages are provided to the controller 202 via a voltage divider 418. Note that all phases are sampled to facilitate multiphase regulatory compliance of the high-power microinverter 106 upon the controller 202 sensing an anomalous voltage level on any of the phases. Specifically, the controller 202 may process all phase-to-phase voltages and all phase-to-neutral voltages.

The controller 202 comprises a processor 420, support circuits 422 and memory 424. The controller 202 may be a microprocessor, microcontroller, application specific integrated circuit (ASIC), or any other form of processor that can perform the control functions described herein. The support circuits 422 comprise circuits and devices that support the functionality of the processor 420 including, but not limited to, clock circuits, cache, power supplies, input/output circuits, analog to digital converters, digital to analog converters, data buffers, and the like. The memory 424 may comprise read only memory (ROM), random access memory (RAM) and/or combinations thereof. The memory 424 (e.g., non-transitory computer readable storage medium having stored thereon instructions that when executed by a processor perform the methods described herein) stores control software 426 to control operation of the inverter 200 and communications device 204 as well as control the solar panels via a maximum power point tracking (MPPT) algorithm 428.

The communications device 204 is coupled to a PLC analog circuit 430 to transmit and receive communications signals carried on the three-phase power line (drop 304 and cable 300). The coupler 206 comprises a trans\former 432 and a capacitive divider 434 to couple the communications signals to0.he three lines and neutral of the three-phase output. The output is coupled through a surge and output filter 436 to the drop 304. Note, as mentioned above, the output of the inverter 200 is a single-phase AC output coupled to lines $L_1$ and $L_2$.

To facilitate operation as a high-power microinverter having a high-power DC input and AC output, the inverter must comply with certain safety regulation concerning arc faults and rapid shutdown. As for arc faults, safety standard UL 1699B requires that inverters handling over 80 VDC must ensure that arc faults cannot occur. An arc fault occurs when the wires coupling the solar panels to the inverter wear to expose the conductors such that a gap is created between exposed wires. An arc can form across such a gap. Typically, compliance requires an active arc fault detection and mitigation circuit, i.e., a circuit that detects an arc fault event and disables the inverter upon event detection.

An embodiment of the present disclosure utilizes an arc fault mitigation device 402 (passive device) at the input to the inverter 200. In one embodiment, the arc fault mitigation device 402 is a voltage storage device such as, for example, but not limited to, a capacitor or bank of capacitors. The arc fault mitigation device 402 is configured to charge to the input voltage provided by the PV panel 104 at input 400. For example, at 502, the method 500 comprises providing, at an input, a first voltage having a maximum voltage from a high-powered distributed generator. Next, at 504, the method 500 comprises providing a second voltage at the input that is lower than the first voltage, where a difference between the first voltage and the second voltage is not large enough to cause an arc. For example, in view of charging the arc fault mitigation device 402, the highest voltage that will appear across a gap in the wiring is the difference between the distributed generator's maximum output voltage and the charge on the device 402. Since maximum power point tracking is generally used in a solar system, the voltage from the distributed generator that is applied to the input is 10-20% below the maximum voltage that can be generated. For example, a series connected solar panel pair may have a maximum output voltage of about 120 VDC and, when controlled by an MPPT algorithm, supplies about 96 volts to the input 400. As such, the device 402 charges to 96 volts, leaving only 24 VDC to potentially form an arc. It is well understood that a voltage of, at least, about 30 VDC is necessary to form a sustained arc. Thus, without using an active arc fault detection and mitigation circuit, embodiments of the disclosure are compliant with safety regulations regarding arc faults.

Note that if the DC wires should be open (e.g., as in a small gap that could facilitate an arc) and the passive arc fault mitigation device is charged only to a low or zero voltage, then there could be a brief high voltage across the gap. If current were to flow across the gap (that is, arc), then the arc fault mitigation device would immediately charge up to the panel voltage, reducing the voltage across the gap to zero volts. Therefore, the arc is extinguished.

PV panels collectively have an open circuit voltage, $V_{oc}$, (when no current is conducted) and a maximum power point voltage, $V_{mpp}$ (when maximum power is produced). These voltages vary with temperature, irradiation, tilt angle, and so on.

The controller 202 causes power to flow through inverter 200, which in turn adjusts the voltage at the input 400. Normally, the inverter maintains this voltage at $V_{mpp}$, though it may drift from $V_{mpp}$ temporarily due to changing environmental conditions, faults, intentional power curtailment, and so forth. The maximum voltage across a gap is equal to $V_{oc}-V_{mpp}$.

The controller 202 must check that it does not force the voltage at the arc fault mitigation device 402 to be maintained at a level where an arc is possible (i.e., where in a potential gap voltage ($V_{oc}-V_{mpp}$) is above 30 V, or whatever threshold is chosen by design). For example, if the combined panel open circuit voltage is 100 V, then the controller should control power flow through the inverter 200 such that the voltage at the input 400 is greater than 70 V. If the voltage is less than this threshold, the controller 202 should deactivate the microinverter 200 as a safety measure.

To facilitate this safety check, in one exemplary embodiment, the controller 202 may periodically disable power through the inverter 200, causing the voltage at the input 400 to reach $V_{oc}$. Then, the controller 202 may measure and record $V_{oc}$. The controller 202 may then resume maximum power point tracking, measuring $V_{mpp}$. The controller 202 may then assess $V_{oc}-V_{mpp}$ on a periodic basis to ensure that the value is below a threshold. This safety check may be repeated daily or as often as desired, with minimal disruption to average power production. A running average of $V_{oc}-V_{mpp}$ (or a ratio of $V_{mpp}/V_{oc}$) may be kept.

Given a running average $R=V_{mpp}/V_{oc}$, then for any given $V_{mpp}$, the $V_{oc}$ may be estimated as $V_{mpp}/R$. The difference may be estimated as $V_{mpp}/R-V_{mpp}$, and checked against an arc threshold (e.g., 30 V).

In relation to rapid shutdown, an applicable standard is 2017 NEC 690.12, which provides that microinverters (including high-power microinverters) having less than 80 V of maximum DC voltage will automatically comply. Furthermore, 2017 NEC 690.12 requires that, if the voltage is above 80 VDC, then special hazard control or rapid shutdown equipment is needed to force the voltage below 80 VDC within 30 seconds of a rapid shutdown initiation. Another alternative is to meet the requirements of an inherently safe PV array, in spite of the voltage potentially being as high as 120 V. The high-power microinverter 106, when paired with a restricted range of PV panels 104, can automatically comply with 2017 NEC 690.12 by demonstrating that if the high voltage is contacted by a rescue worker, the resulting current will be below a dangerous limit (this is now codified in the new standard, UL 3741). As such, to avoid the need for rapid shutdown circuitry, the distributed generator may be selected to have a maximum current that is below a dangerous limit as defined in the regulations.

The compliance with rapid shutdown and arc fault, as above, permits two typical, 72-cell, PV panels 104 to be connected in series external to the high-power microinverter 106. This reduces cost in at least two ways: 1) a reduced number of DC connectors on the high-power microinverter (1 pair instead of 2 pairs) and 2) lower DC currents due to series instead of parallel connection. The lower number of DC connectors saves cost on the connector in addition to reducing the size of the high-power microinverter by eliminating enclosure area needed to mount the connectors. The lower DC currents mean smaller conductor sizes within the high-power microinverter 106, saving on component sizes and PCB area.

Another aspect of the high-power microinverter 106 is that it presents as a three-phase inverter to the user and to the grid but is actually a single-phase inverter in terms of power. This is achieved, as described above, by providing AC connector pins for all three phases and neutral on the high-power microinverter 106. Two of these phase pins are used for providing power, the other two are used for sensing of the other phase voltages. For example, pin 1 and pin 2 may connect to phase 1 and phase 2, while pin 3 connects to phase 3 and pin 4 connects to the system neutral (e.g., two of the four terminals are used for outputting AC power and two terminals of the four terminals are used for sensing phase voltages and communication). Power is only applied between pins 1 and 2, while pins 3 and 4 are used for sensing and communication. In this way, the inverter can sense all three phase-phase and all three phase-neutral voltages. This permits the microinverter to comply with standards such as IEEE 1547-2018, which compel a microinverter (including a high-power microinverter) to respond to voltages on all three phases (i.e., momentarily cease power generation if voltages on any of the three phases is anomalous).

For example, a drop in voltage on one phase-phase or phase-neutral measurement might compel all three phases to momentarily cease power generation. There are also tight requirements around low-voltage ride-through, such that the high-power microinverter 106 may need to temporarily disrupt power ("momentary cessation") when one of the six voltage drops below a threshold, but "restore output" within a short time (e.g., 83 ms) after the voltage recovers. The high-power microinverter 106 senses all three phase-to-phase and all three phase-to-neutral voltages locally, at its terminals via the voltage divider 418. This allows a fast response to changing grid conditions, compared to not directly sensing the phase and neutral voltages. That is, if not directly sensing, then those voltages must be estimated (problematic for accuracy) or received by a communication broadcast (slow, unreliable) from the gateway.

Each high-power microinverter 106 produces power on the same two of the four AC pins. A four-wire cable connects the microinverters to the grid, but with a phase rotation between successive "drops" on the cable. In this way, each phase has substantially the same number of microinverters installed, inherently balancing the system.

Furthermore, the high-power microinverters 106 are each equipped with a PLC modem which couples the PLC signal from neutral to one or more of the phase pins. Via the phase rotation of the cable, the PLC signal is effectively coupled to all three phases simultaneously. This helps ensure that each microinverter can communicate to a PLC-equipped gateway that may only be coupled from one phase to neutral, thus eliminating a need for a "phase coupler" that spreads the PLC signal from one phase to the others.

From the point of view of an installer, the unit is a three-phase inverter since, when combined with the phase rotation cable and other inverters on the same cable, it connects directly to a three-phase grid.

With minor adaptation, the high-power microinverter 106 can be configured for single-phase operation, by connecting a two-wire, single-phase cable to pins 1 and 2 on each high-power microinverter. This leaves pins 3 and 4 available for other uses. For example, they can be used for communication rather than voltage sensing. This communication could be performed using the existing PLC communication circuitry/protocol or replaced with another two-wire communication by making minor changes to the circuit and control software 426 (e.g., CAN bus protocol). In either case, the PLC communication signal can be decoupled from pins 1 and 2 and only coupled between pins 3 and 4. In this way, there is a communication bus separate from the power bus. This can be advantageous if there is need to isolate the high-power microinverters 106 from other PLC communication domains or to avoid noise that may be on the power line.

This could be the case, for example, in the optional storage system 102 of FIG. 1, wherein two or more high-power microinverters 112 are connected in parallel to a single-phase grid. Within the storage system itself, there is a need for communication with a battery management unit 124. This has conventionally been performed by adding a "battery controller" board that manages the overall battery system, including communication with both high-power microinverters 112 and battery management unit 124. Using the communication in the high-power microinverter, the high-power microinverters 112 can communicate directly to the battery management unit 124, avoiding the cost of the battery controller board.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the disclosure presented herein. The disclosure is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, BC, ABC, ABB, etc.). When "and/or" is used, it should be understood that the elements may be joined in the alternative or conjunctive.

While the foregoing is directed to embodiments of the present disclosure, other and further embodiments of the disclosure may be devised without departing from the basic scope thereof, and the scope thereof is determined by the claims that follow.

The invention claimed is:

1. Apparatus for converting DC power to AC power comprising:
   an input adapted to be coupled to a high-powered distributed generator having a maximum voltage at a first voltage;
   an arc fault mitigation device, coupled to the input, for providing a second voltage at the input that is lower than the first voltage; and
   a controller configured to maintain the second voltage at the arc fault mitigation device by controlling power flow through the high-powered distributed generator such that a difference between the first voltage and the second voltage is not large enough to cause an arc.

2. The apparatus of claim 1, wherein the arc fault mitigation device comprises one of a capacitor or bank of capacitors.

3. The apparatus of claim 1, wherein the arc fault mitigation device is configured to charge to the maximum voltage at the input such that a highest voltage that appears across a gap in a wiring connecting the high-powered distributed generator to the arc fault mitigation device is a difference between the maximum voltage and a charge on the arc fault mitigation device.

4. The apparatus of claim 1, wherein the maximum voltage is equal to $V_{oc}-V_{mpp}$, where $V_{oc}$ is an open circuit voltage and $V_{mpp}$ is a maximum power point voltage.

5. The apparatus of claim 4, wherein the controller is further configured to periodically disable power through the apparatus to cause a voltage at the input to reach $V_{oc}$.

6. The apparatus of claim 1, wherein the input is adapted to be coupled to a pair of high-powered distributed generators connected in series with each other.

7. The apparatus of claim 1, wherein an output of the apparatus is connected to a cable drop comprising four terminals, and wherein two of the four terminals are used for outputting AC power and two of the four terminals are used for sensing phase voltages and communication.

8. A method for converting DC power to AC power in an apparatus comprising:
   providing, at an input, a first voltage having a maximum voltage from a high- powered distributed generator;
   providing a second voltage at the input that is lower than the first voltage; and
   maintaining the second voltage at the arc fault mitigation device by controlling power flow through the high-powered distributed generator such that a difference between the first voltage and the second voltage is not large enough to cause an arc.

9. The method of claim 8, wherein an arc fault mitigation device of the input comprises one of a capacitor or bank of capacitors.

10. The method of claim 8, further comprising charging an arc fault mitigation device of the input to the maximum voltage at the input such that a highest voltage that appears across a gap in a wiring connecting the high-powered distributed generator to the arc fault mitigation device is a difference between the maximum voltage and a charge on the arc fault mitigation device.

11. The method of claim 8, wherein the maximum voltage is equal to $V_{oc}-V_{mpp}$, where $V_{oc}$ is an open circuit voltage and $V_{mpp}$ is a maximum power point voltage.

12. The method of claim 11, further comprising periodically disabling power through the apparatus to cause a voltage at the input to reach $V_{oc}$.

13. The method of claim 8, wherein the input is adapted to be coupled to a pair of high-powered distributed generators connected in series with each other.

14. The method of claim 8, wherein an output of the apparatus is connected to a cable drop comprising four terminals, and wherein two of the four terminals are used for outputting AC power and two of the four terminals are used for sensing phase voltages and communication.

15. A non-transitory computer readable storage medium having stored thereon instructions that when executed by a processor perform a method for converting DC power to AC power in an apparatus comprising:
   providing, at an input, a first voltage having a maximum voltage from a high-powered distributed generator;
   providing a second voltage at the input that is lower than the first voltage; and
   maintaining the second voltage at the arc fault mitigation device by controlling power flow through the high-powered distributed generator such that a difference between the first voltage and the second voltage is not large enough to cause an arc.

16. The non-transitory computer readable storage medium of claim 15, wherein an arc fault mitigation device of the input comprises one of a capacitor or bank of capacitors.

17. The non-transitory computer readable storage medium of claim 15, further comprising charging an arc fault mitigation device of the input to the maximum voltage at the input such that a highest voltage that appears across a gap in a wiring connecting the high-powered distributed generator to the arc fault mitigation device is a difference between the maximum voltage and a charge on the arc fault mitigation device.

18. The non-transitory computer readable storage medium of claim 15, wherein the maximum voltage is equal to $V_{oc}-V_{mpp}$, where $V_{oc}$ is an open circuit voltage and $V_{mpp}$ is a maximum power point voltage.

19. The non-transitory computer readable storage medium of claim 18, further comprising periodically disabling power through the apparatus to cause a voltage at the input to reach $V_{oc}$.

20. The non-transitory computer readable storage medium of claim 15, wherein the input is adapted to be coupled to a pair of high-powered distributed generators connected in series with each other.

* * * * *